United States Patent

[11] 3,582,195

[72] Inventor  Joseph Pignone
     Essex County, N.J.
[21] Appl. No. 786,987
[22] Filed    Dec. 26, 1968
[45] Patented June 1, 1971
[73] Assignee Charles Beseler Company
              East Orange, N.J.

[54] AUDIOVISUAL DISPLAY APPARATUS
     13 Claims, 18 Drawing Figs.
[52] U.S. Cl. ................................................ 352/1,
     248/316, 248/481, 274/4, 352/34, 352/78,
     352/104, 353/15
[51] Int. Cl. ........................................... G03b 31/06,
                                                   G03b 21/30
[50] Field of Search ....................................... 352/1, 2,
     34, 35, 72, 104, 147, 126, 242, 243; 353/71, 15

[56]              References Cited
              UNITED STATES PATENTS
| | | | |
|---|---|---|---|
| 2,517,387 | 8/1950 | Cunningham et al. | 352/34 |
| 2,575,579 | 11/1951 | Bullock et al. | 352/34 |
| 2,925,009 | 2/1960 | Larson et al. | 352/34 |
| 3,275,395 | 9/1966 | Petelle | 325/72X |
| 3,281,199 | 10/1966 | Kingston | 352/34X |
| 3,375,054 | 3/1968 | Hughes | 352/72X |
| 3,387,535 | 6/1968 | Bennett | 352/104X |
| 3,454,333 | 7/1969 | Wells | 352/72 |
| 3,466,123 | 9/1969 | Skuja | 352/126X |
| 3,488,112 | 1/1970 | Hickl | 352/72 |
| 3,495,901 | 2/1970 | Neudecker et al. | 352/72 |

Primary Examiner—Louis R. Prince
Assistant Examiner—Joseph W. Roskos
Attorney—Darby and Darby ABSTRACT: An audiovisual display apparatus including a collapsible rear-projection viewing screen, a projection system having an adjustable mirror for projecting images on the viewing screen, and an audiovisual cartridge containing an endless loop of film and a separate audio tape. Also included are a mechanism for locking the audiovisual cartridge in position for use and for engaging the audio tape drive mechanism and sound reproduction head, and an attachment for converting the audiovisual apparatus to project images on a remote wall or screen rather than on the collapsible rear-projection viewing screen.

PATENTED JUN 1 1971  3,582,195

INVENTOR
JOSEPH PIGNONE

BY *Darby & Darby*

ATTORNEYS

INVENTOR
JOSEPH PIGNONE
BY Darby & Darby
ATTORNEYS

INVENTOR
JOSEPH PIGNONE
BY Darby & Darby
ATTORNEYS

PATENTED JUN 1 1971

INVENTOR
JOSEPH PIGNONE

BY Darby & Darby

ATTORNEYS

INVENTOR
JOSEPH PIGNONE
BY Darby & Darby
ATTORNEYS

AUDIOVISUAL DISPLAY APPARATUS

This invention relates to improved audiovisual display apparatus. More particularly, this invention relates to an improved self-contained portable audiovisual display unit for automatically showing a sequence of slides synchronized with a recorded voice program.

The combined presentation of a series of photographic transparencies or slides with an appropriate and suitably synchronized voice program has been found an effective and efficient way of communicating sales promotional or technical materials.

Accordingly, various types of apparatus have been developed in order to conveniently provide a combined audiovisual display. Such apparatus is preferably lightweight and compact so that it may be advantageously carried and used by salesmen to make sales presentations.

One type of audiovisual apparatus is described in U.S. Pat. No. 3,028,790 to Roger Wade et al. This apparatus forms a self-contained unit approximately the size of an ordinary attache case. The apparatus includes a collapsible viewing screen, an automatic slide projector for successively projecting the frames of an endless loop of slidefilm, a magnetic audio-tape playback mechanism and a synchronizing mechanism for advancing the slidefilm in response to a signal recorded on the magnetic tape.

It is an object of the present invention to provide an improved audiovisual display apparatus suitable for sales promotional and/or pedagogical uses.

It is a more particular object of this invention to provide an audiovisual display apparatus which combines the advantages of both compactness and light weight with improved versatility and convenience of use.

It is a further object of this invention to provide an audiovisual display apparatus adapted to use a combined audiovisual cartridge containing both an endless loop of slidefilm and a magnetic sound tape.

It is also an object of this invention to provide audiovisual display apparatus having an improved locking mechanism for locking an audiovisual cartridge in position for use and for bringing about the engagement of the audio-tape drive mechanism and sound reproduction head with the audio-tape contained in the audiovisual cartridge.

It is still another object of this invention to provide a locking mechanism in which the movements of the cartridge-engaging locking lugs, the tape drive pinch roller and the magnetic sound reproduction head are all independently adjustable.

It is yet another object of this invention to provide a locking mechanism in which the movement of the locking lugs, tape drive pinch roller and magnetic sound reproduction head are all controlled by a single control lever.

It is still a further object of this invention to provide an improved audiovisual cartridge containing an endless loop of slide audiovisual and a magnetic sound tape.

It is still another object of this invention to provide audiovisual display apparatus having a projection system, including an adjustable projection mirror adapted for use with a cartridge containing the slide film to be projected.

It is yet another object of this invention to provide audiovisual apparatus which may be readily converted to provide either rear projection on a self-contained collapsible viewing screen or front projection on a self-contained collapsible viewing screen on front projection on a remote wall or projection screen.

Other objects and advantages of the audiovisual display apparatus of the present invention will be apparent from the following detailed description and the accompanying drawings which set forth the principles of the invention and, by way of illustration, the best mode contemplated of carrying out those principles.

Figure 1:
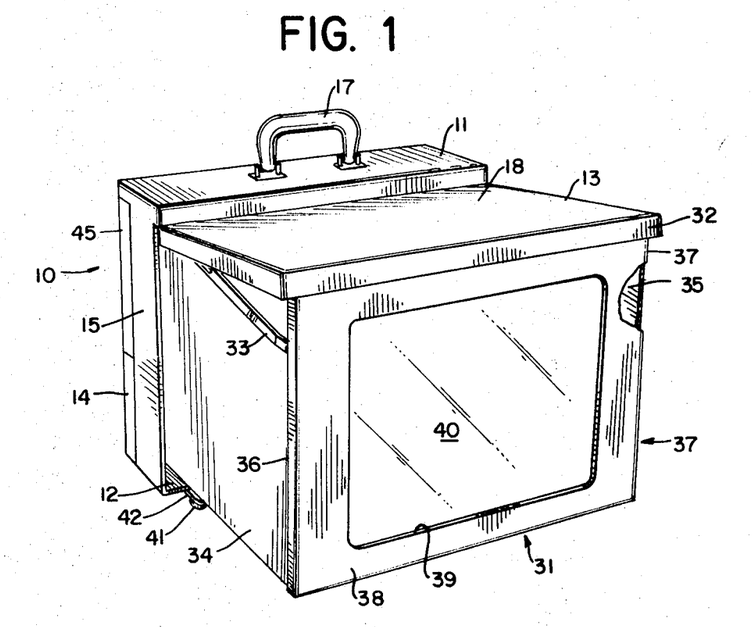
FIG. 1 is a perspective view of the portable audiovisual apparatus of the present invention with the front cover open and the viewing screen and side flaps arranged in position for use.
Figure 2:
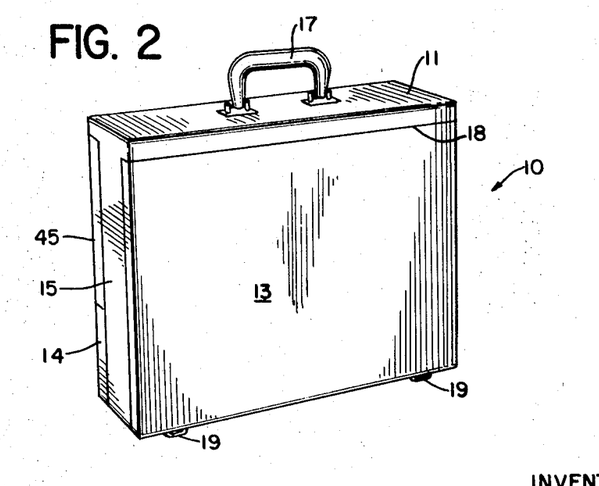
FIG. 2 is a perspective view of the portable audiovisual apparatus of FIG. 1 with both the front cover and the rear cover closed and locked in position for carrying.

Referring now to FIGS. 1 and 2 for a more detailed description of the portable audiovisual apparatus of the present invention, there is shown a case 10 having a top 11, bottom 12, front 13, back 14 and opposed sides 15 and 16. The case 10 may be constructed of metal, fiberboard, plywood or similar material and may be covered by vinyl sheet material simulating leather or other suitable material, in order to provide an attractive appearance. The top 11 is provided with a handle 17 which facilitates the carrying of case 10 which is preferably of the same dimensions as an ordinary attache case. The case 10 together with the audiovisual components mounted therein preferably weighs approximately 19 lbs. or less and is thus readily portable.

The front 13 of case 10 comprises a cover which is hinged to case 10 at its top edge 18 and is retained in its closed position, as shown in FIG. 2, by latches 19 mounted on the bottom of the case.

When the latches are depressed, the front cover 13 may be pivoted outward and upward about its hinged top edge 18.

When the front cover 13 is in its open position as shown in FIG. 1, the viewing screen assembly 31 which is folded in juxtaposition with front cover 13 for storage, may be pivoted downward and outward about its top edge which is hinged to the front cover 13 inside the bottom edge 32 thereof.

A pair of side flaps 34 and 35 are hinged to viewing screen assembly 31 by means of hinges mounted inside the side edges 36 and 37 of viewing screen assembly 31. The side flaps 34 and 35 lie flat against viewing screen assembly 31 when viewing screen assembly 31 is in the closed position, but are preferably spring-biased to swing outward to the open position shown in FIG. 1 when the viewing screen assembly 31 is in position for viewing.

When in the open position, the free ends of side flaps 34 and 35 rest inside the edges of ends 15 and 16 of case 10. Referring to FIG. 1, the viewing screen assembly swings (counterclockwise) downward from the cover 32 until it is stopped by bracing arms 33, and when so fully opened the side flaps 34 and 35 swing outward under the action of spring biased hinges. The entire assembly (cover 32, opened screen 37 and side flaps 34 and 35) would then tend to rotate (clockwise) about the hinge line 18, but are prevented from doing so by the free ends of the side flaps 34 and 35 resting against the inside edges of case 10 as mentioned above. Side flaps 34 and 35 in combination with front cover 13, case 10 and viewing screen assembly 31 form a light excluding structure which provides good slide projection characteristics.

The screen assembly 31 includes a screen frame 38 having a substantially rectangular opening 39. A translucent screen 40 extends across the opening 39 and is held in position by conventional means. The screen 40 is translucent and may be fabricated from a vinyl, acrylic or similar resin and processed on one side to produce a matte translucent finish for arresting the image and enhancing the directional viewing properties of the screen.

On the bottom of the carrying case are two arms 42 and on the end of each arm is mounted a rubber foot 41. These arms are equal in length to the width of the carrying case assembly when the front door is closed, thus providing the broad base of support necessary to provide stability when the front cover 13, the viewing screen assembly 31, and the side flaps 34 and 35 are extended for use.

Figure 3:
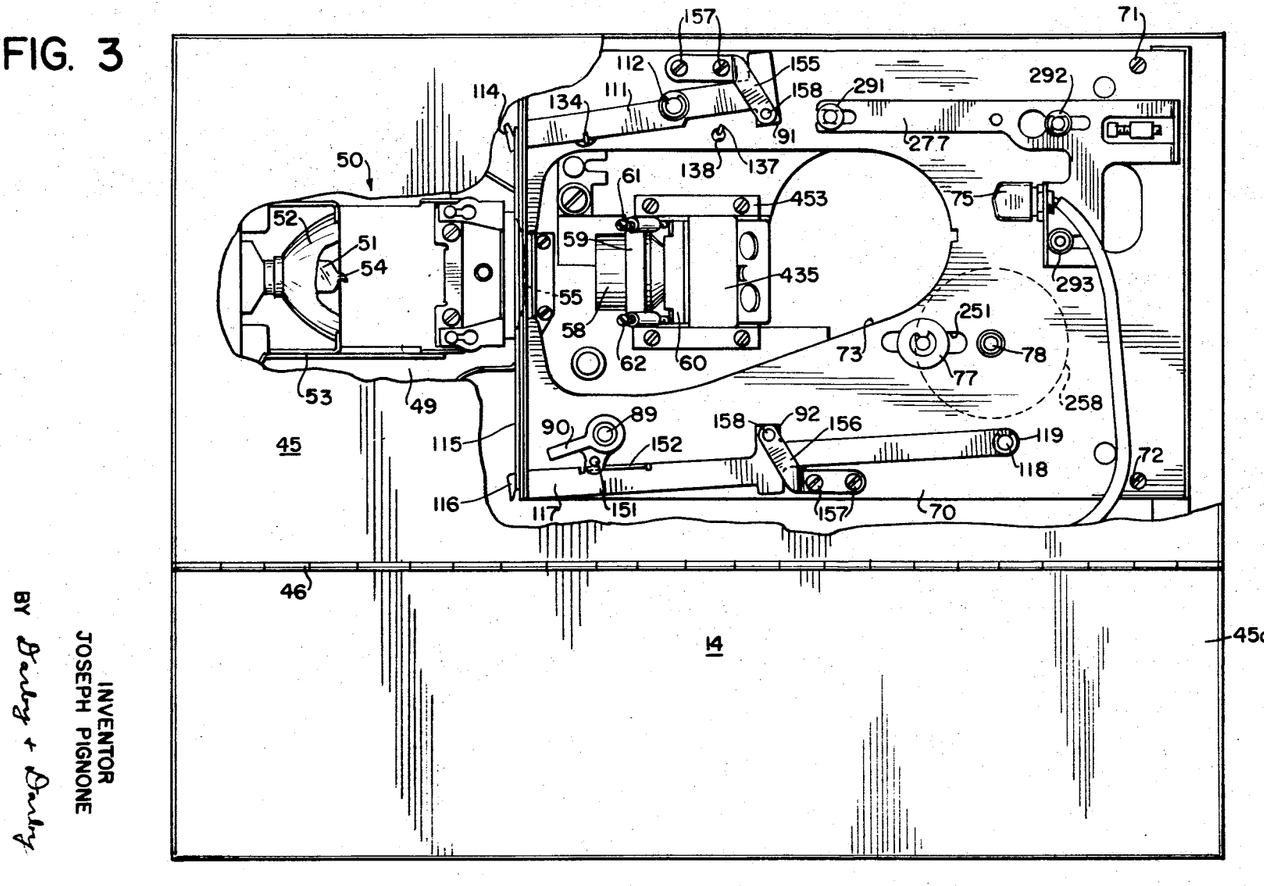
FIG. 3 is a side elevational view of the rear of the portable audiovisual apparatus shown in FIGS. 1 and 2 with portions broken away to show the details of the projection system and the cartridge mounting plate.

Referring now to FIG. 3, there is shown a detailed view of the rear 14 of the carrying case 10 including a rear cover 45 hinged to a removable panel 45a by means of a piano-type hinge 46. This bottom portion 45a of the rear cover assembly is removably fastened to the case by suitable means (not shown) to provide access to the electronic components when necessary. Part of the rear cover 45 is broken away to show the details of the projection system, generally designated 50, and the mounting plate 70 including the mechanism for locking the audiovisual cartridge 95 in position for use.

Figure 10:
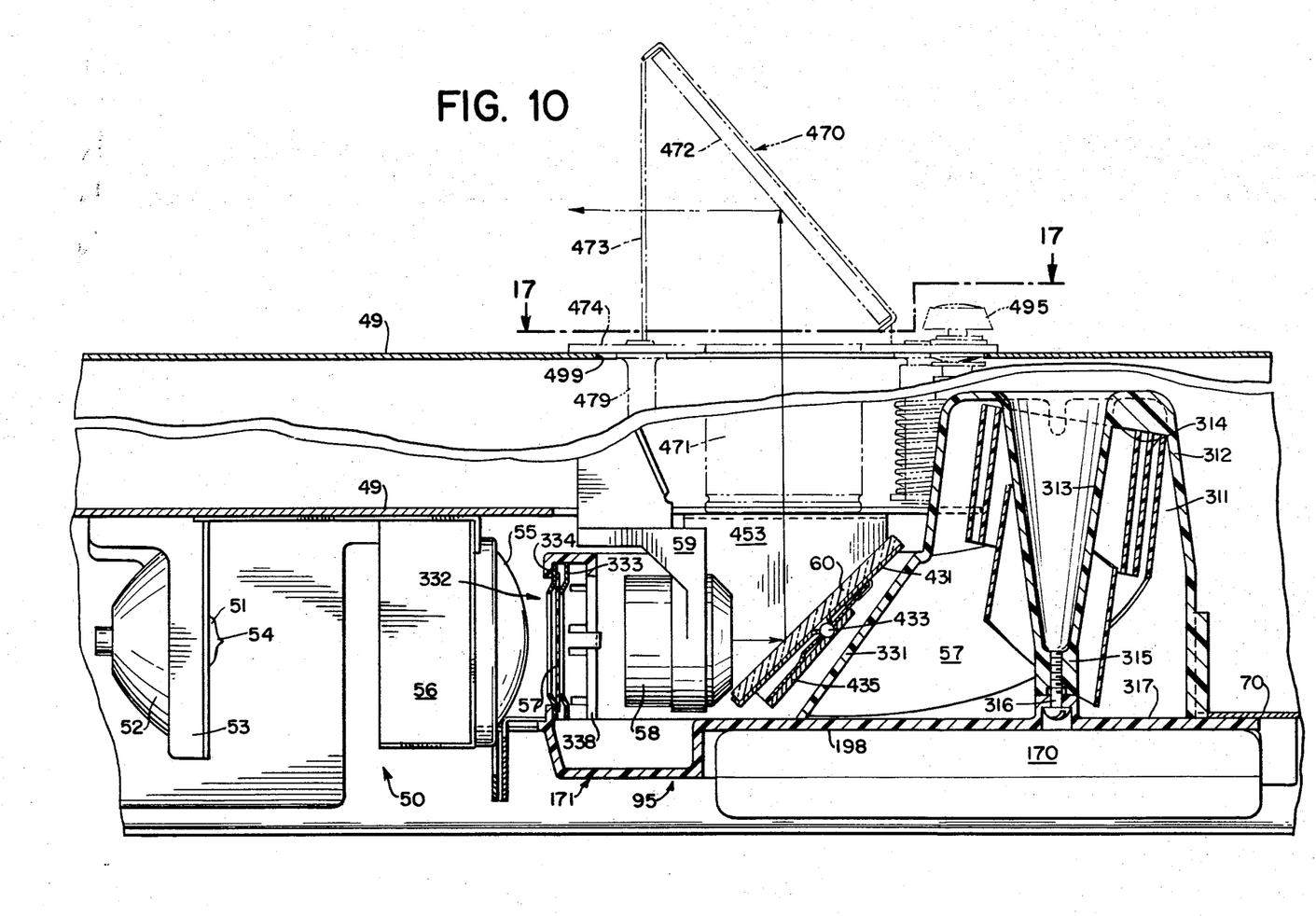
FIG. 10 is a detailed cross-sectional view taken along the line 10–10 of FIG. 4 showing the construction of the projection system and the visual slidefilm cartridge according to the present invention.

As shown in FIGS. 3 and 10, the projection system 50 includes a small, quartz halogen light bulb 51 which is positioned axially within a parabolic reflector 52 which is mounted to the chassis of the audiovisual device by a bracket 53. The bulb 51 is preferably of a commercially available type similar to the type of bulb employed in conventional motion picture projection apparatus. The tip 54 of bulb 51 may be frosted in order to provide a more uniform beam of light. The bulb is so positioned within the reflector that the emerging beam is slightly converged, the amount of convergence being such that after passing through, and being further refracted by, the condenser 55 the light beam converges at the plane, thus illuminating the central portion of the film that would otherwise not be illuminated because of the relative opacity of the end of the bulb. The condensing lens 55 is mounted on the chassis 49 of the present audiovisual apparatus by means of bracket 56. If desired, the bracket 56 may be attached to the chassis 49 of the audiovisual apparatus by means of "eye and slot" arrangement as shown in FIG. 3 so that the condenser lens 55 may easily be demounted from chassis 49. The condenser lens 55 causes the beam of light from bulb 51 and parabolic reflector 52 to converge through the film 57 (shown in FIG. 10) to the projection lens 58.

While the illustrative embodiment of the present invention shown in FIGS. 3 and 10 employs a projection system including the combination of a parabolic reflector 52 and a converging lens 55, it will be apparent to those skilled in the art that other arrangements may be employed to accomplish the same purpose. For example, an elliptical reflector might be employed to produce a converging beam of light which might either pass directly through the film 57 to the projection lens 58, or through a condensing lens to increase the convergence of the light and thence through the film 57 to the projection lens 58. Another method of providing illumination is with a conventional optical system in which the lamp stands vertically between a conventional condensing system and a suitable reflector.

The projection lens 58 is mounted on the chassis of the present audiovisual apparatus by means of a bracket 59. The projection lens 58, which is used for projecting an image on the viewing screen 40 shown in FIG. 1, is readily removable from the bracket 59 so that another projection lens having a longer focal length may be substituted for the purpose of projecting images on a wall or on a remote screen as will be explained in greater detail hereinafter.

The light from projection lens 58 is reflected from an adjustable front surface mirror 60 onto the rear of the projection screen 40 shown in FIG. 1. A pair of adjustment screws 61 and 62 are provided so that the orientation of mirror 60 may be adjusted to properly frame the projected image on projection screen 40 as will be explained in greater detail herein after in connection with FIGS. 10, 15 and 16.

The mounting plate 70 is fastened to the chassis 49 of the present audiovisual apparatus by conventional means such as, for example, screws 71 and 72. Mounting plate 70 has an opening 73 which is adapted to receive an audiovisual cartridge 95 according to the present invention. Mounting plate 70 also supports and carries the mechanism for locking the audiovisual cartridge 95 in position for use and for bringing the magnetic pickup head 75 and the tape drive mechanism, including the pinch roller 77 and drive capstan 78, into engagement with the magnetic sound tape which is contained within the audiovisual cartridge.

Figure 4:
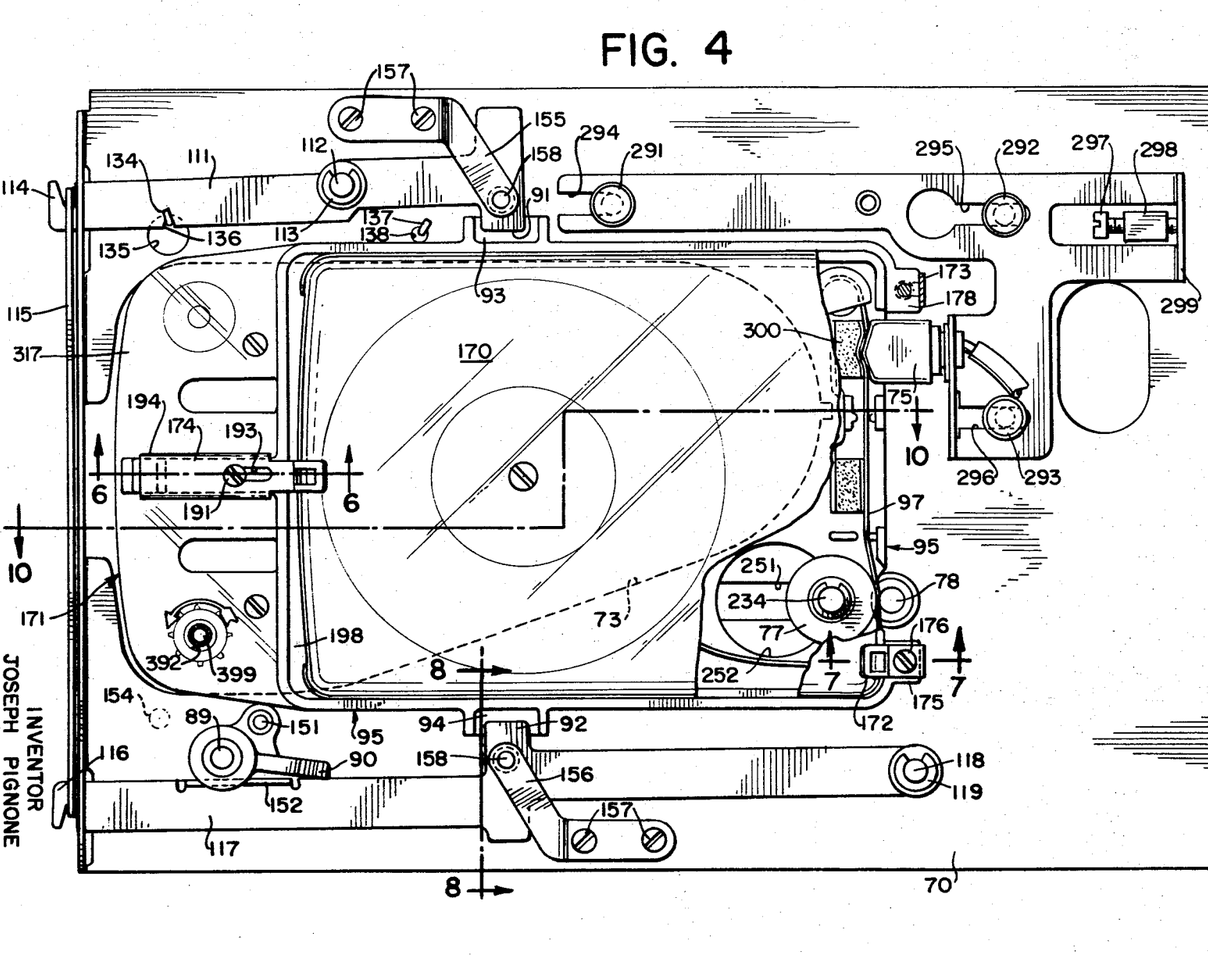
FIG. 4 is a detailed side elevational view of the cartridge mounting plate shown in FIG. 3 with an audiovisual cartridge according to the present invention shown locked in position for use.

Referring particularly to FIGS. 3 and 4, there is shown a locking lever 90 which is mounted on a pin 89 extending through mounting plate 70, and which controls the locking mechanism for the audiovisual cartridge 95 as well as the engagement of the drive mechanism 77, 78 and the magnetic head 75 with the magnetic sound tape. In FIG. 3, the locking lever 90 is shown in the open position. Cartridge locking lugs 91 and 92, magnetic head 75 and pinch roller 77 are shown in the retracted position. The audiovisual cartridge has been removed to reveal the opening 73 in mounting plate 70 and the subassembly of the projection system including projection lens 58 and adjustable mirror 60.

In FIG. 4, on the other hand, the locking lever 90 is shown in the locked position. The locking lugs 91 and 92 are shown in engagement with their associated slanted ramps 93 and 94 which are formed in the sides of the audiovisual cartridge generally designated 95. The magnetic head 75 is in operative engagement with the magnetic sound tape 97 as are the pinch roller 77 and drive capstan 78.

The mechanism for locking the audiovisual cartridge 95 into position for use includes a first locking arm 111 which is pivotally mounted on a stud 112 projecting from the mounting plate 70. The locking arm 111 is retained in position on stud 112 by a C-ring 113. One end of the locking arm 111 forms the locking lug 91, and the other end is in the form of a hook 114 which engages one end of a link member 115. The other end of link member 115, which is shaped so as not to interfere with the projection path, is engaged by the hook 116 formed at one end of the second locking arm 117. The other end of the second locking arm 117 is pivotally mounted on a stud 118 projecting from the mounting plate 70 and is retained in position by the C-ring 119. The locking lug 92 projects from approximately the middle of locking arm 117.

Figure 5:
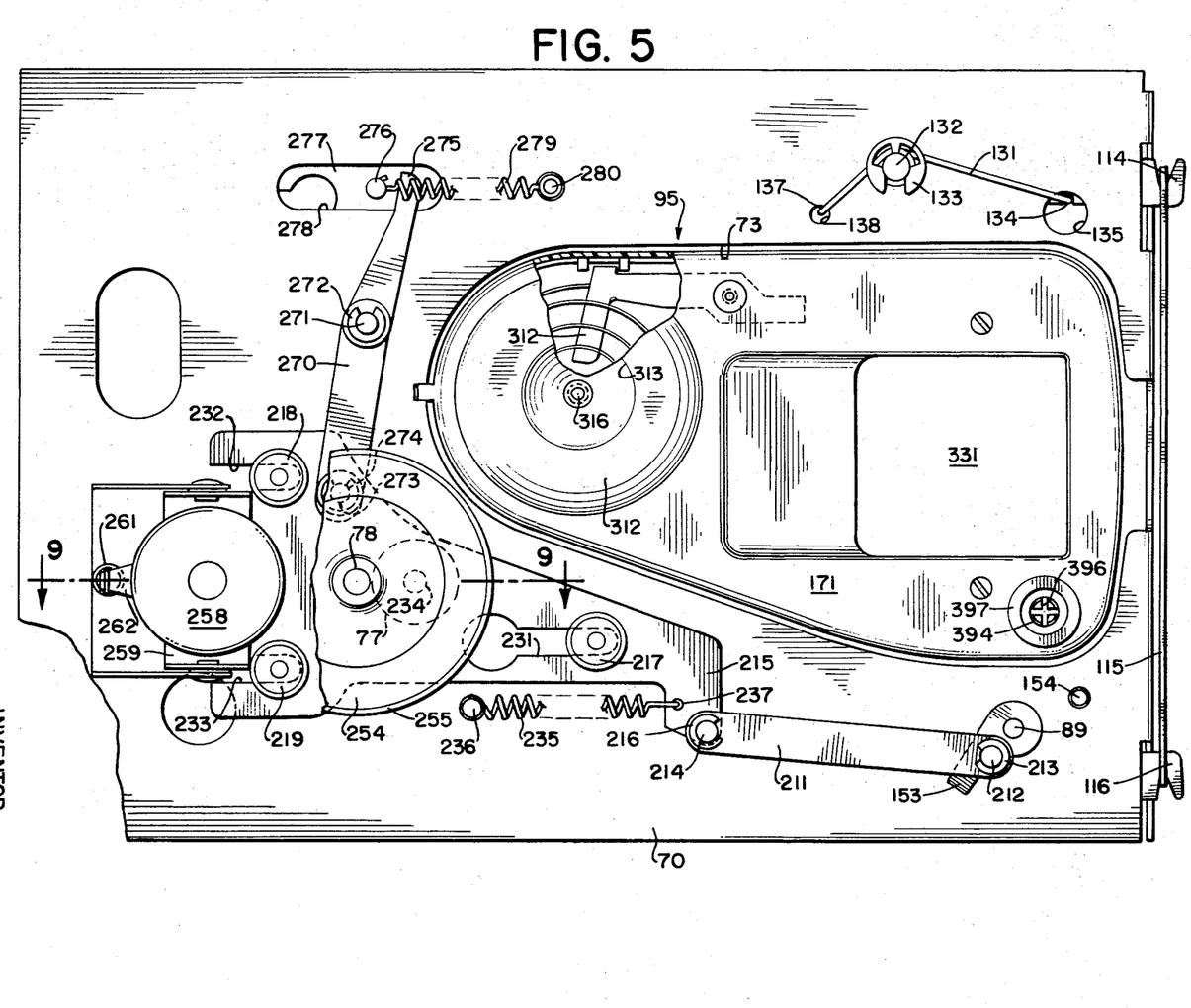
FIG. 5 is a detailed side elevational view of the reverse side of the cartridge mounting plate shown in FIG. 4.

The end of arm 111 carrying hook 114 is urged upward by means of a spring 131 shown in FIG. 5. The spring 131 is pivotally mounted on a stud 132 projecting from the rear surface of mounting plate 70 and is retained in position by means of the C-ring 133. One end 134 of spring 131 extends through an opening 135 in mounting plate 70 and engages a notch 136 in locking arm 111. The other end 137 of spring 131 extends through and engages a small hole 138 in mounting plate 70 to provide an anchoring point for the application of upward force to locking arm 111 by the other end 134 of spring 131. The action of spring 131 urges locking lug 91 downward into engagement with its associated ramp 93 in audiovisual cartridge 95. At the same time, the action of spring 131 also urges hook 114 upward. This upward force is transmitted via link member 115 and hook 116 to the second locking arm 117 with the result that locking lug 92 is urged upward into engagement with its associated slanted ramp 94 in audiovisual cartridge 95.

The unlocking of lugs 91 and 92 from their respective ramps 93 and 94 is accomplished by rotating the locking lever 90 in a counterclockwise direction from the position shown in FIG. 4. When the pin 151 projecting from locking lever 90 contacts the cam surface 152 of locking arm 117, the locking arm 117 begins to pivot downward about stud 118 thus withdrawing lug 92 from ramp 94. The downward movement of arm 117 is transmitted via hook 116 link member 115 and hook 114 to locking arm 111 thus causing lug 91 to be withdrawn from ramp 93. These actions are accomplished against the resistance of spring 131. Lugs 91 and 92 are fully withdrawn from ramps 93 and 94 shortly before locking arm 117 reaches its maximum downward position in response to the action of roller cam 151 and the cam surface 152. The counterclockwise rotation of locking lever 90 is continued until the projection 153 of the locking lever assembly contacts the pin 154 extending from the reverse side of mounting plate 70 as shown in FIG. 5. At this point the pin 151 has moved past its maximum downward position so that the action of spring 131 serves to retain projection 153 in contact with pin 154. The locking mechanism thus remains open for the removal and insertion of audiovisual cartridges according to the present invention.

Figure 8:
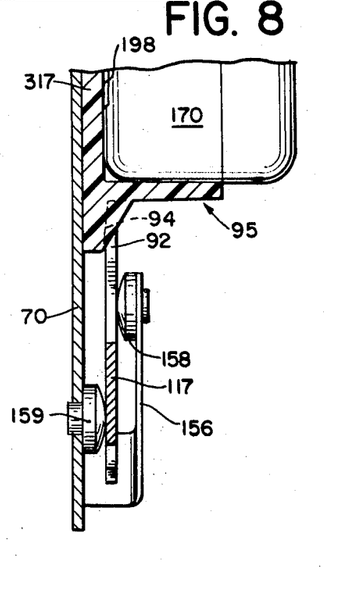
FIG. 8 is a detailed cross-sectional view taken along the line 8–8 of FIG. 4 showing the locking lug 4 locking the audiovisual cartridge to the mounting plate.

In order to insure that the locking lugs 91 and 92 hold the audiovisual cartridge 95 securely against the mounting plate 70, a pair of arms 155 and 156 made of a spring tempered material are provided. Each of the arms 155 and 156 is securely mounted on mounting plate 70 by suitable means such as, for example, screws 157. Mounted at the end of arm 156 is a button made of nylon or other suitable material. As shown more clearly in FIG. 8 which is a cross-sectional view taken along the line 8-8 of FIG. 4, the nylon button 158 contacts the outer side of lug 92 thus urging lug 92 toward slanted cam surface 162 of ramp 94. A second nylon button 159 is mounted on mounting plate 70 and contacts the underside of the lower end of lug 92. It will be apparent that the two buttons 158 and 159 cooperate to urge the operative end of lug 92 toward slanted ramp 94 so that the audiovisual cartridge 95 will be firmly locked in position against mounting plate 70 when lug 92 engages ramp 94. Similar buttons including button 161 mounted at the end of arm 155 are provided for locking lug 91, and ramp 93 is similarly provided with a slanted ramp 93. The buttons 158, 159 and 161 are made of nylon or other suitable material to provide easy operation with a minimum of wear.

In addition to controlling the mechanism for locking and unlocking the audiovisual cartridge 95 the locking lever 90 also controls the movement of magnetic head 75 and pinch roller 77 which engage the magnetic sound tape 97 of the audiovisual cartridge 95. However, before describing the mechanism for moving the tape head 75 and pinch roller 77, it will be useful to discuss the nature of the preferred form of audiovisual cartridge according to the present invention.

Figure 7:
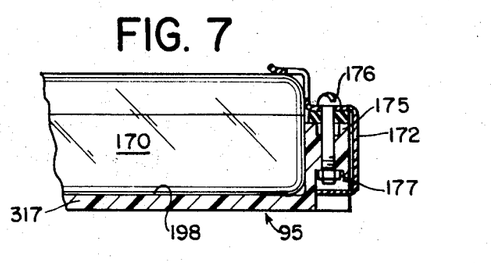
FIG. 7 is a detailed cross-sectional view taken along the line 7–7 of FIG. 4 showing another part of the mechanism for mounting the audio-tape cartridge on the visual slidefilm cartridge.

The audiovisual cartridge 95 includes two major subassemblies, a visual subassembly or visual cartridge 171 which contains the slidefilm to be projected, the film window and the film advance sprocket, and the audio subassembly or audio cartridge 170 which contains the magnetic sound tape. In the preferred form of the present invention, the audio cartridge subassembly 170 is seperable from the visual cartridge subassembly 171. The audio cartridge 170 is preferably mounted piggyback fashion upon the visual cartridge 171 in order to form the unitary audiovisual cartridge 95. The audio cartridge 170 is held in position by clamps 172, 173 and 174. As shown in greater detail in FIG. 7 which is a detailed cross-sectional view taken along the line 7-7 of FIG. 4, the clamp 172 is secured to the end portion 175 of visual cartridge 171 by means of a bolt 176 and nut 177. Clamp 173 is similarly attached to the projecting end portion 178 of visual cartridge 171.

Figure 6:
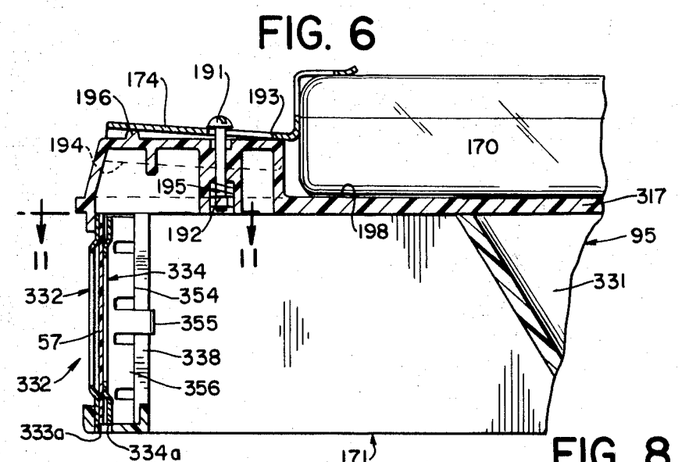
FIG. 6 is a detailed cross-sectional view taken along the line 6–6 of FIG. 4 showing part of the mechanism for mounting the audio-tape cartridge on the visual slidefilm cartridge.

FIG. 6 which is a detailed cross-sectional view taken along the line 6-6 of FIG. 4 shows the detailed construction of clamp 174. Clamp 174 is held in position by a self-tapping screw 191 threaded into the body of the cartridge. The bolt 191 passes through a slot 193 in clamp 174 so that clamp 174 may be moved into and out of engagement with audio cartridge 170. A flange or pair of flanges 194 extend downward from the sides of clamp 174 into corresponding slots in a visual cartridge 171 so as to keep clamp 174 aligned for proper engagement with audio cartridge 170. Screw 191 acts in cooperation with projection 196 from the surface of visual cartridge 171 to urge the end of 197 of clamp 174 downward so as to firmly hold the audio cartridge 170 in position within the recess 198 provided in top of visual cartridge 171.

The audio cartridge 170 may be of a commercially available type such as, for example, the FIDELIPAC audio cartridge manufactured under U.S. Pat. No. 2,778,635 and others.

Referring now to FIGS. 4 and 5, it will be seen that the mechanism for moving magnetic head 75 and pinch roller 77 is controlled by the same locking lever 90 which controls the movement of locking lugs 91 and 92. Referring particularly to FIG. 5, there is shown the projecting arm 153 which is rigidly connected to locking lever 90 by means of a pin 89 which is rigidly connected to locking lever 90 by means of a pin 89 which extends through mounting plate 70. One end of a connecting link 211 is retained in position on a stud 212 projecting from arm 153 by means of a C-ring 213. The other end of connecting link 211 is retained in position on a stud 214 which projects from movable plate 215 by means of C-ring 216.

The movable plate 215 is retained in position adjacent mounting plate 70 by means of retaining elements 217, 218 and 219 each of which comprises a central stud rigidly mounted on plate 70 and an enlarged head for retaining movable plate 215 in position. The retaining elements 217, 218 and 219 respectively engage slots 231, 232 and 233 in movable plate 215 to permit side-to-side movement of plate 215. The pinch roller 77, which is shown in dotted lines in FIG. 5 is mounted for free rotation on a pin 234 which is in turn rigidly mounted on movable plate 215. A spring 235, which is anchored to stud 236 projecting from mounting plate 70, engages small hole 237 in movable plate 215 to urge plate 215 toward the left to bring about the engagement of pinch roller 77 with tape drive capstan 78 as shown in FIG. 5.

Figure 9:
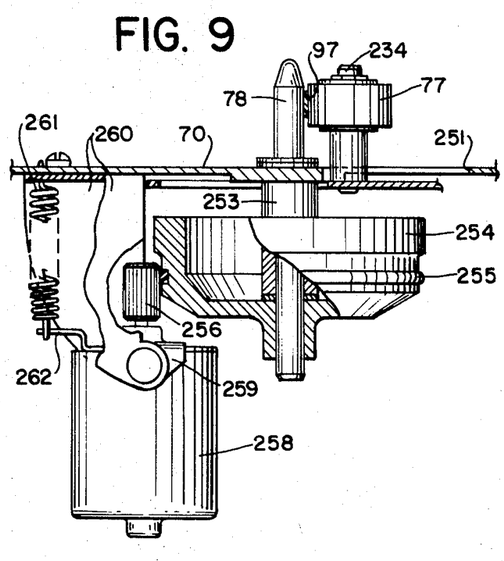
FIG. 9 is a detailed cross-sectional view taken along the line 9–9 of FIG. 5 showing the capstan drive mechanism for the audio-tape cartridge.

Referring now to FIG. 9, there is shown a detailed cross-sectional view taken along the line 9-9 of FIG. 5 of the pinch roller 77, drive capstan 78 and their associated mechanisms. The pin 234 which carries pinch roller 77 extends through an opening 251 in mounting plate 70. The opening 251 is in the form of a slot which coincides with round opening 252 formed in the bottom of audio cartridge 170 as shown in FIG. 4. The drive capstan 78 is journaled within a sleeve 253 which is mounted on and extends through mounting plate 70. A large drive wheel 254 is rigidly attached to the lower end of drive capstan 78. The drive wheel 254 is preferably encircled by a circumferential strip of rubber or other suitable material in order to provide a nonslip frictional engagement with drive roller 256 which is driven by electric drive motor 258. It will be apparent that, because of their relative sizes, the drive roller 256 and drive wheel 254 form a speed reduction arrangement coupling motor 258 to drive capstan 78. Drive wheel 254 also serves as a fly wheel for capstan 78.

The drive motor 258 is mounted on a plate 259 which is pivotally mounted on a bracket 260 which is rigidly mounted on the rear surface mounting plate 70. A spring 261 which is anchored to mounting plate 70 engages a projecting arm 262 of mounting plate 259 so as to urge drive roller 256 into contact with drive wheel 254.

Referring again to FIG. 5 of the drawings, there is shown an arm 270 which is pivotally mounted on a stud 271 projecting from mounting plate 70. Arm 270 is retained on stud 271 by a C-ring 272. One end of arm 270 is connected to movable 215 by means of a stud 273 and C-ring 274. The other end 275 of arm 270 is adapted to engage stud 276 which is mounted on movable plate 277 which carries the magnetic head 75 as shown more clearly in FIG. 4. The stud 276 projects through a slot 278 in mounting plate 70 and is engaged by one end of spring 279, the other end of which is anchored to mounting plate 70 at point 280. Spring 279 acts through stud 276 and movable plate 277 to urge magnetic head 75 into contact with the magnetic sound tape 97 of the audio cartridge 170. The magnetic head 75 is retracted from magnetic sound tape 97 by the action of arm 270 as will be explained in greater detail hereinafter.

Referring again to FIG. 4 of the drawings, movable plate 277 is held in position adjacent cartridge mounting plate 70 by means of retaining elements 291, 292 and 293 which project from mounting plate 70 and have enlarged heads to retain the movable plate 277 in position. The retaining elements 291, 292 and 293 respectively engage slots 294, 295 and 296 in movable plate 277 so as to permit the side-to-side movement of plate 277. A setscrew screw 297 is provided in order to permit precise control of the positioning of magnetic head 75 in contact with magnetic sound tape 97. The setscrew 297 threadedly engages a sleeve 298 which is mounted on plate 70. The end of setscrew 297 contacts the upturned end portion 299 of movable plate 277 thus precisely controlling the position of magnetic head 75 with respect to resilient pressure pad 300 and thereby controlling the contact pressure between magnetic head 75 and tape 97 in order to provide optimum reproduction of the recorded sound.

Briefly recapitulating the operation of the mechanisms controlled by locking arm 90, reference is made to FIG. 3 which shows the locking arm 90 in open position. Magnetic head 75 is retracted and the upturned end 299 of movable plate 277 is out of contact with the end of setscrew 297. The pinch roller 77 is spaced apart from capstan 78 and no audiovisual cartridge is in position within the opening 73 in mounting plate 70.

In order to lock an audiovisual cartridge into position for use, the cartridge is first placed within the opening 73 so that the laterally projecting surfaces of the cartridge 95 rest in contact with the mounting plate 70. The locking lever 90 is then rotated in a counterclockwise direction so as to release pin 151 from cam surface 152 thus allowing arm 117 to move upward and arm 111 to pivot about stud 112 until the lugs 91 and 92 engage the slanted ramps 93 and 94 in the sides of the audiovisual cartridge 95. At this point the audiovisual cartridge 95 is locked in position as shown in FIG. 4 and the movement of arms 111 and 117 stops.

During the foregoing movements of locking lever 90 and locking lugs 91 and 92, the projecting arm 153 which is connected to locking lever 90 through locking plate 70 by pin 89 has moved into the counterclockwise direction away from stud 154. This allows movable plate 215 to move to the left under the influence of spring 235 thus bringing pinch roller 77 closer to stationary drive capstan 78. At the same time, the action of arm 270 allows movable plate 277 (as shown in FIG. 5) to move to the right under the influence of spring 279 thus bringing the magnetic head 75 (shown in FIG. 4) closer to the magnetic sound tape 97 and resilient pressure pad 300.

At the point when locking lugs 91 and 92 become fully engaged with ramps 93 and 94, the magnetic head 75 is short of reaching magnetic tape 97 and the pinch roller 77 is short of reaching drive capstan 78. Further counterclockwise rotation of locking arm 90 brings the magnetic head 75 into contact with the magnetic tape 97 and brings the upturned end portion 299 of movable plate 277 into contact with the end of setscrew 297 as shown in FIG. 4. At this point the motion of plate 277 and magnetic head 75 stops, and the end 275 of arm 270 moves away from stud 276 as shown in FIG. 5. Further counterclockwise movement of locking lever 90 allows movable plate 215 to continue moving until pinch roller 77 contacts magnetic sound tape 97 pinching it against drive capstan 78 with the force provided by spring 235. The operation of locking lever 90 is, at this point, complete, and, assuming that the viewing screen is properly deployed, the apparatus is in condition to begin the presentation of an audiovisual display.

From the foregoing description, it will be apparent that the locking mechanism controlled by locking lever 90 provides several operational advantages. For example, the locking lugs 91 and 92, magnetic head 75 and pinch roller 77 are all independently positionable in their operative positions. This greatly facilitates the problem of adjusting the mechanism because each of the items may be adjusted separately. For example, in the mechanism of the present invention, adjustment of the operative position of the magnetic head 75 will not prevent pinch roller 77 form properly pinching the magnetic tape 97 against drive capstan 78, nor will it interfere with the proper engagement of locking lugs 91 and 92 with ramps 93 and 94. Further, the sequence of operation of the mechanism with the locking lugs 91 and 92 becoming fully engaged with ramps 93 and 94 before magnetic head 75 and pinch rollers 77 reach their operative positions, helps avoid possible damage to the mechanism or to the magnetic tape 97 or audio cartridge 170.

In order to unlock and remove the audiovisual cartridge 95, the locking lever 90 is rotated in a clockwise direction from the position shown in FIG. 4. The initial clockwise rotation in FIG. 4 of locking lever 90 causes the projecting arm 153 shown in FIG. 5 to rotate in a counterclockwise direction thus drawing movable plate 215 toward the right against the tension of spring 235 thus retracting pinch roller 77 from the stationary tape drive capstan 78. Further movement of plate 215 brings end 275 of arm 270 into contact with the lug 276 projecting from movable plate 277 which carries the magnetic head 75 as shown in FIG. 4. Continued movement of plate 215 causes movable plate 277 to move in the opposite direction against the tension of spring 279 thus retracting the magnetic head 75 from magnetic tape 97.

The foregoing movements are accomplished before pin 151 contacts the cam surface 152 on arm 117 shown in FIG. 4. Continued clockwise movement of locking lever 90 cams arm 117 downward and pivots arm 111 about stud 112 against the tension of spring 134 thus retracting the locking lugs 91 and 92 from the ramps 93 and 94 in a audiovisual cartridge 95. In addition, further retraction of magnetic head 75 and pinch roller 77 from magnetic tape 97 is accomplished during this phase. The unlocking movement is completed when projecting arm 153 contacts stud 154 shown in FIG. 5. At this point pin 151 has passed its maximum downward position so that spring 134 acts to keep locking lever 90 in the open position shown in FIG. 3.

Referring now to FIG. 10, there is shown a detailed cross-sectional view of the visual cartridge 171 taken along the line 10-10 of FIG. 4. The visual cartridge 171 includes a spoollike compartment 311 which holds several coils of slidefilm 57. Although the slidefilm 57 is preferably 35 mm. color film, it will be appreciated that other types of film may be employed if desired. The compartment 311 has an outer wall 312 in the shape of a frustum or truncated cone, a conical inner wall 313 and a slanted bottom rib 314 arranged to hold the coils of slidefilm 57 without binding so that the slidefilm 57 may be fed into and drawn out of compartment 311 without snarling or damaging the emulsion.

For illustration the outer wall 312 may form an angle of approximately 15° to its axis while the conical inner wall 313 also forms an angle of 15° with its axis and the slanted bottom rib 314 forms an angle of approximately 15° to the top plate 317 of visual cartridge 171. A finger extending from the outer wall 312 may be employed to help hold the coil of film in position.

The slidefilm 57 is fed into compartment 311 around the outside of the coil, and drawn out of compartment 311 from the inside of the coil around conical inner wall 313. The conical inner wall 313 extends from the slanted "bottom" rib 314 of compartment 311 to the opposite side or "top" of visual cartridge 171. The apex 315 of conical inner wall 313 receives a screw 316 which holds the top plate 317 of visual cartridge 171 in position. As explained above, the top plate 317 of visual cartridge 171 has a recessed portion 198 for receiving audio cartridge 170. The top plate 317 also extends to the film window of visual cartridge 171 and cooperates to hold the drive sprocket and idler roller in position as will be explained in greater detail hereinafter.

The visual cartridge 170 also has a well 331 which permits the projecting lens 58 and mirror 60 to be approximately positioned in the projection path as shown in FIG. 10.

Figure 11:
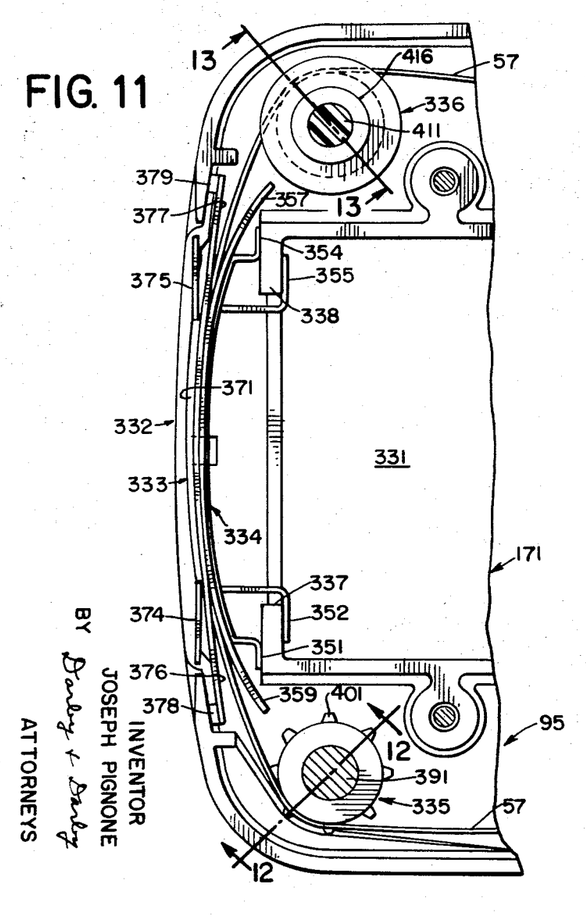
FIG. 11 is a detailed cross-sectional view taken along the line 11–11 of FIG. 6 showing the projection window and film advance mechanism of the visual slidefilm cartridge.

FIG. 11 is a detailed cross-sectional view of the visual cartridge 171 showing the film window 332, pressure plates 333 and 334, drive sprocket 335 and idler roller 336. The pressure plates 333 and 334 are preferably made of metal or other suitable material. The outer plate 333 is relatively resilient while the inner pressure plate 334 is relatively stiff. 371 slidefilm 57 passes between the pressure plates 333 and 334. The resilient plate 333 presses the edges of slidefilm 97 against plate 334 so as to hold the film 97 substantially flat in order to provide good projection characteristics. At the same time, pressure plate 333 is sufficiently resilient to allow film splices to pass between the pressure plates 333 and 334 without jamming.

Figure 14:
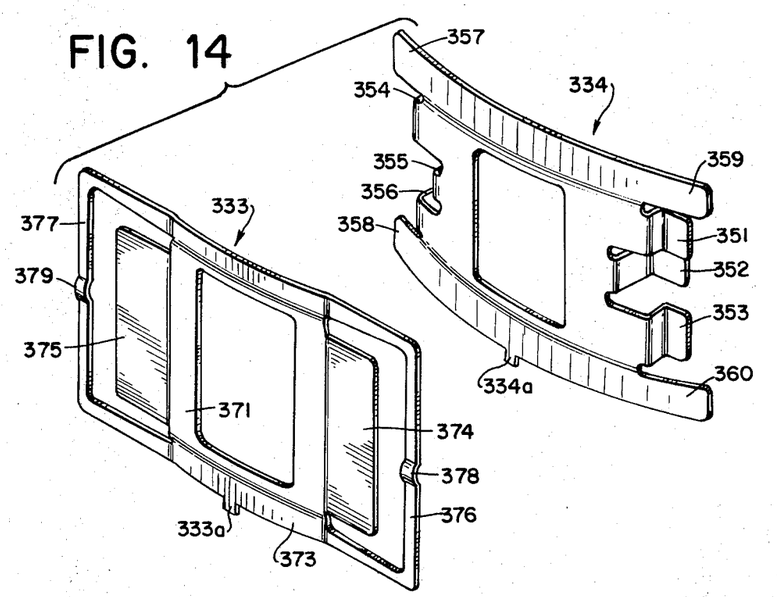
FIG. 14 is an exploded view of the film holding pressure plate of the visual slidefilm cartridge.

As shown more clearly in FIG. 14 which is an exploded view of pressure plates 333 and 334, the ends of the rigid pressure plate 334 are formed into a plurality of fingers which engage the adjacent portions of visual cartridge 171 and which guide the slidefilm 97. Fingers 351, 352 and 353 grip portion 337 of visual cartridge 171 while fingers 354, 355 and 356 grip portion 338 of visual cartridge 171. Fingers 357 and 358 guide the film 97 between the pressure plats 333 and 334 and similar fingers 359 and 360 guide the film 97 moving toward drive sprocket 335.

The central film framing portion 371 of pressure plate 333 is formed outward from the top and bottom edges 372 and 373 of pressure plate 333 in order to give clearance to the natural transverse curvature of film 97 and to avoid scratching the emulsion on the surface thereof. The portions 374 and 375 adjacent central film framing portion 271 are bent outward in order to admit air to lubricate the passage of the slidefilm 97. The ends 376 and 277 of pressure plate 333 are provided with small projections 378 and 379 which permit the pressure plate to rock laterally to conform to the position of the more rigid plate 334. Both the rigid plate 334 and the more resilient plate 333 are provided on the lower edge with tabs, 334a and 333a respectively, which mate with a corresponding depression in the visual cartridge and accurately locate the transverse centerline of the aperture in the two plates.

Both pressure plates 333 and plate 334 are held in the cartridge by captivation in the space provided and prevented from small movements within the aforementioned space by spring force alone.

Figure 12:
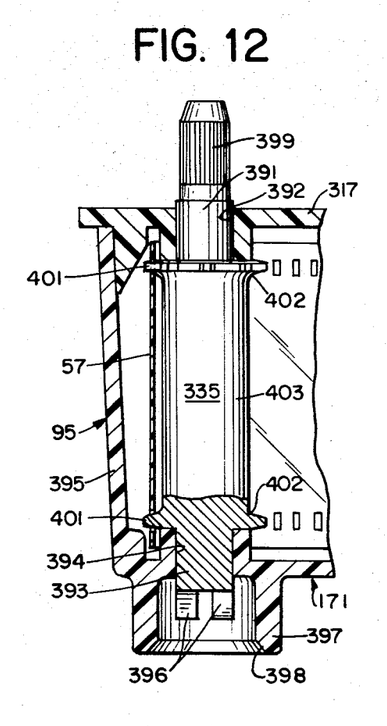
FIG. 12 is a detailed cross-sectional view taken along the line 12–12 of FIG. 11 showing the film advance sprocket of the visual slidefilm cartridge.

FIG. 12 is a detailed cross-sectional view of the drive sprocket 335 taken along the line 12-12 of FIG. 11. One end 391 of the drive sprocket 335 is journaled within a suitable passage 392 in the top plate 317 of visual cartridge 171. The other end 393 of drive sprocket 335 is journaled within a suitable passage 394 in the body 395 of visual cartridge 171. The end 393 of drive sprocket 335 is provided with a pair of crossed slots 396 for engaging the slidefilm drive mechanism of the subject audiovisual apparatus which may be similar to the slidefilm drive mechanism described in U.S. Pat. No. 3,028,790 to Roger Wade et al. and assigned to the assignee of the present invention. The operative end of the slidefilm drive mechanism is provided with a single blade or pair of crossed blades adapted to cooperate with the crossed slots 396 of drive sprocket 335. A cylindrical projection 397 having a bevelled inner edge 398 is provided to help guide the operative end of the drive mechanism into engagement with the crossed slots 396 of drive sprocket 335. The other end 391 of drive sprocket 335 is provided with a knurled stem 399 which permits the manual adjustment of the angular position of drive sprocket 335 to bring about the engagement of crossed slots 396 with the operative end of the slidefilm drive mechanism or to adjust the position of slidefilm 57.

As shown in FIG. 12, the teeth 401 of drive sprocket 335 project from raised flanges 402 which hold the slide film 57 away form the central portion 403 of drive sprocket 335 so as to avoid possible scratching of the film 97.

Figure 13:
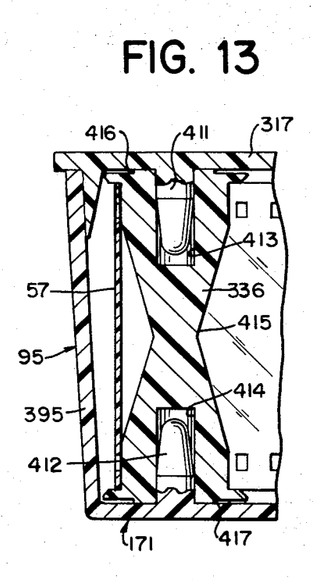
FIG. 13 is a detailed cross-sectional view taken along the line 13–13 of FIG. 11 showing the idler roll of the visual slidefilm cartridge.

FIG. 13 is a detailed cross-sectional view of the idler roller 336 taken along the line 13-13 of FIG. 11. The idler roller 336 revolves on suitable projections 411 and 412 which project respectively from the top plate 317 and body 395 of visual cartridge 171. The projections 411 and 412 are respectively received within the cylindrical recesses 413 and 414 which are formed in the ends of the idler roller 336. The ends of idler roller 336 are of larger diameter than its center 415 so that the central portion of slidefilm 57 is free of contact with the idler roller 336 thus avoiding possible scratching of the projection transparencies. The ends of idler roller 336 are provided with flanges 416 and 417 in order to maintain the precise vertical alignment of slidefilm 57. The idler roller 336 may be moulded of a structural nylon or other suitable material. The idler roller 336 may be moulded in one piece or in two separate pieces joined at the center 415.

Figure 15:
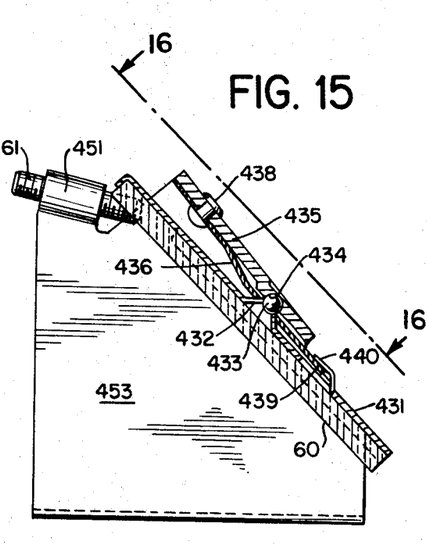
FIG. 15 is a detailed side elevational view of the projection mirror and the mechanism for adjusting it.

Referring now to FIG. 15 of the drawings, there is shown a detailed view of the mounting mechanism for adjustable projection mirror 60. The projection mirror 60, which is preferably a front-surfaced mirror in order to avoid double images, is mounted on a backing plate 431 which may be made of metal or other suitable material. A conical raised portion 432 is provided near the center of plate 431 to engage a ball bearing 433. The ball bearing 433 rests in a suitable depression 434 in plate 435 which is a part of the bracket 453 which is mounted on the chassis 49 of the present audiovisual apparatus by means of bolts or other suitable mounting devices.

The ball bearing 434 is retained in position in depression 435 by the action of a flat sheet 436 of spring material which is attached to piece 435 preferably by means of rivets 437 and 438. Spring 436 is provided with a hole of slightly smaller diameter than ball bearing 433 so as to hold ball bearing 433 in position in depression 434 while allowing a portion of ball bearing 433 to project for engagement with conical projection 432 of plate 431. The end 439 of spring 436 engages mounting plate 431. In the preferred embodiment shown in FIGS. 15 and 16 the end 439 of spring 436 simply slips under tab 440 which is stamped out of plate 431. Spring 436 thus urges the mounting plate (as illustrated in FIG. 15) to rotate in a clockwise direction about ball bearing 433, the actual motion being limited to screws 61 and 62. Adjustment of both screws an equal amount would cause the mirror to rotate solely about an axis perpendicular to the plane of the drawing. However, because of the articulated spring loading around the ball, adjustment of either screw separately would cause the mirror to have a component of rotation about an axis parallel to the plane of the drawing, thus permitting universal angular adjustment.

Figure 16:
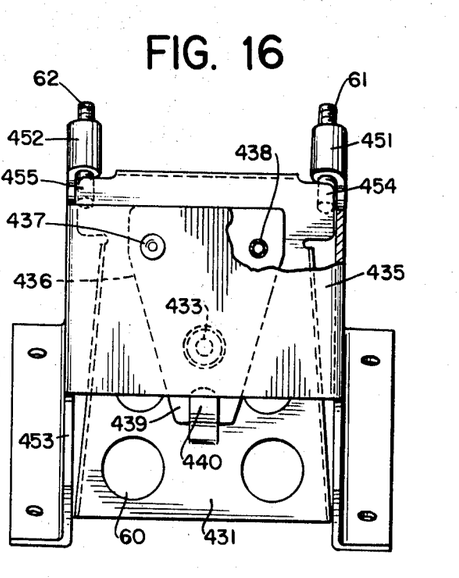
FIG. 16 is another view of the projection mirror adjusting mechanism taken along the line 16–16 of FIG. 15.
Figure 17:
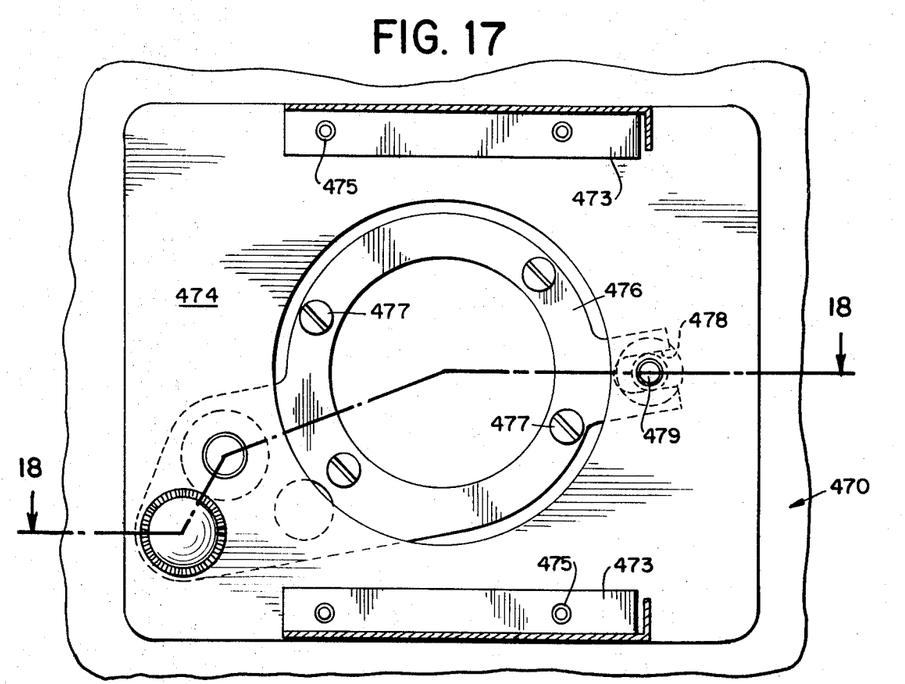
FIG. 17 is a detailed cross-sectional view of the optional wall-projection system taken along the line 17–17 of FIG. 10.
Figure 18:
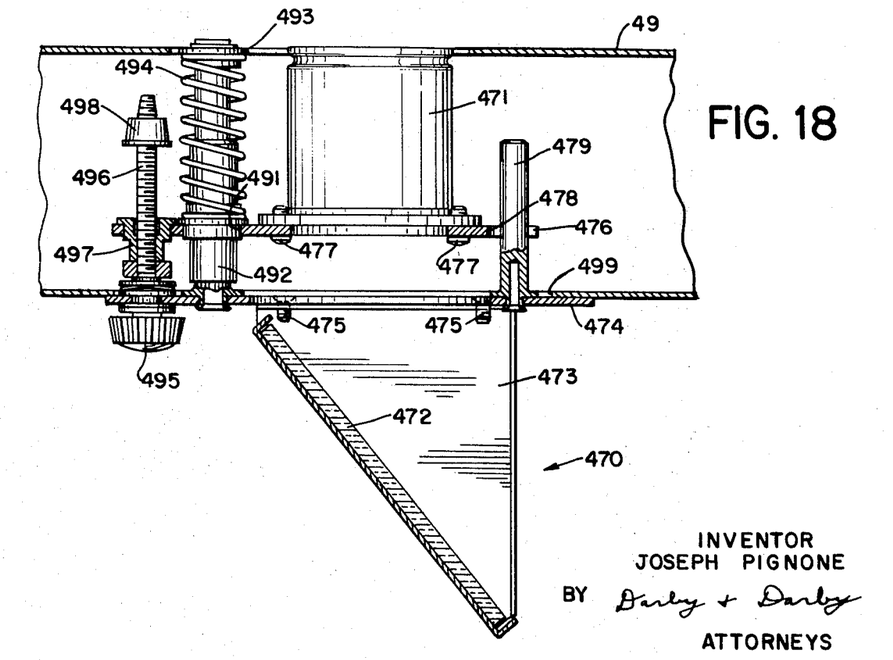
FIG. 18 is a cross-sectional view of the wall-projection mechanism taken along the line 18–18 of FIG. 17.

FIG. 16 is a detailed view taken along the line 16-16 of FIG. 15 of the adjustable mounting mechanism for projection mirror 60. As shown in FIG. 16, the adjustment screws 61 and 62 are carried by a pair of interiorly threaded sleeves 451 and 452 which are mounted on bracket 453. The ends of screws 61 and 62 contact ears 454 and 455 which project laterally from mounting plate 431. Adjustments of screws 61 and 62 causes the projection mirror 60 to pivot about ball bearing 433 so as to permit proper framing of the projected image on projection screen 40 shown in FIG. 1. FIGS. 17 and 18 of the drawings are detailed views of the optional attachment generally designated 470, for projecting images on a front-projection screen or wall of the like.

FIG. 10 shows the wall projection attachment 470 (in phantom lines) knotted on the chassis of the present audiovisual apparatus in position for use. It will be appreciated, however, that the projection lens 58 shown in FIG. 10 must first be removed before wall projection can be properly accomplished. The wall projection attachment 470 includes a long focal length projection lens 471 which is suitable for projecting the images on a wall, front-projection screen or the like. The wall projection attachment 470 also includes a mirror 472 which serves to invert (or reinvert) the projected image from an image which is suitable for rear-projection to an image which is suitable for front-projection. Referring to FIG. 1 of the drawings, it will be appreciated that front-projection is accomplished by folding one of the side flaps 34 or 35 inward against viewing screen assembly 37 to permit the rays from mirror 472 to be projected upon the wall. Referring again to FIG. 10 it will be further appreciated that mirror 472 is mounted at an angle of slightly larger than 45° to the chassis 49 of the audio-visual apparatus of the present invention in order to permit the diverging projected rays to be projected onto a remote front-projection screen without impinging on the chassis 49 of the audiovisual apparatus.

Referring to FIG. 17 of the drawings, there is shown a detailed cross-sectional view of the wall projection attachment 470 taken along the line 17-17 of FIG. 10. FIG. 18 is a cross-sectional view taken along the line 18-18 of FIG. 17. The mirror 472 is mounted on a bracket 473 which is in turn mounted on a plate 474 by means of screws 475 or other suitable means. The long focal length projection lens 471 is mounted on a movable bracket 476 by means of screws 477 or other suitable means. The movable bracket 476 has a slot 478 adapted to engage post 479 which is mounted on plate 474. Plate 476 also has an opening 491 which slideably engages the post 492 which is also mounted on plate 474. A flange 493 which is mounted on the free end of post 492 provides support for a coil spring 494 which surrounds post 492 and urges movable bracket 476 toward plate 474. A knurled adjustment knob 495 has a threaded shaft 496 which extends through plate 474 and threadedly engages a sleeve 497 which is mounted on movable bracket 476. The focusing of the image projected on a remote wall or front-projection screen is therefore accomplished by turning knob 495 which controls the positioning of projection lens 471. A nut 498 mounted on threaded shaft 496 limits the range of adjustment.

The wall projection attachment 470 is mounted in position for use by inserting the lens 471 and associated equipment through the opening 499 in the chassis 49 of the audiovisual apparatus which provides egress for the projected rays when the rear-projection screen 40 (Shown in FIG. 1) is in use. The plate 474 is larger than opening 499 and thus serves to locate the wall projection attachment 470 against the chassis. The wall projection attachment 470 is then clamped in position by a suitable clamping device not shown.

While the principles of the present invention have been illustrated by reference to a preferred embodiment of the present audiovisual apparatus, it will be appreciated by those skilled in the art that certain modifications and adaptations of the preferred embodiment may be made without departing from the spirit and scope of the present invention as set forth with particularity in the appended claims.

I claim:
1. An audiovisual display apparatus comprising:
   a chassis having a projection opening;
   an illuminating system including a light source, a condensing system to gather and converge the light from said light source toward a projection lens, a projection lens, an adjustable reflector device for reflecting the light from said projection lens through said projection opening in said chassis;
   a film cartridge including a cartridge body for holding and guiding an endless loop of film, said cartridge body including two sides spaced apart a distance corresponding to the width of said film; a film window extending between said two sides of said cartridge body for holding a frame of said film for projection, said film cartridge being mountable on said chassis so that said film window is disposed between said condenser and said projection lens; a recess in one of said two sides of said cartridge body adjacent said film window to receive said projection lens and said adjustable reflector device; a compartment extending from said one of said two sides of said cartridge body a distance corresponding to the width of said film for holding a coil of said film; an audio-tape cartridge containing an audio-tape mounted on the other of said two sides of said cartridge body; and a pair of ramps extending from opposite sides of said cartridge body;
   a locking mechanism for locking said audiovisual cartridge in position for use including a mounting plate mounted on said chassis and having an opening for receiving said audiovisual cartridge;
   a first arm having a first end and a second end, said first end of said first arm being pivotally mounted on said mounting plate;
   a second arm having a first end and a second end, said second arm being pivotally mounted at its middle on said mounting plate;
   a link member linking said second end of said first arm to said first end of said second arm;
   a first locking lug projecting from the middle of said first arm toward said opening in said mounting plate;
   a second locking lug projecting from said second end of said second arm toward said opening in said mounting plate;
   spring means urging said first locking lug and said second locking lug to engage said ramps projecting from opposite sides of said audiovisual cartridge to hold said audiovisual cartridge in position within said opening in said mounting plate;
   a control lever pivotally mounted on said mounting plate adjacent one of said arms; and
   a cam element mounted on said control lever for contacting and moving said one of said arms to withdraw said first and second locking lugs from said ramps to release said audiovisual cartridge when said control lever is rotated;
   an audio-tape drive capstan;
   an audio-tape pinch roller;
   second spring means urging said pinch roller toward said drive capstan;
   a movable sound reproduction head;
   third spring means urging said sound reproduction head toward said audio tape in said audiovisual cartridge; and
   means connected to said control lever for retracting said pinch roller from said drive capstan and for retracting said sound reproduction head from said audio tape when said control lever is rotated to retract said first and second locking lugs from said ramps projecting from said audiovisual cartridge and for permitting said pinch roller to contact said drive capstan in response to said second spring means and for permitting said sound reproduction head to contact said audio tape in response to said third spring means when said control lever is rotated to cause said first and second locking lugs to engage said ramps projecting from said audiovisual cartridge and thus lock said audiovisual cartridge in position within said opening in said mounting plate.

2. A film cartridge as in claim 1 further comprising a first and second pressure plate for holding said film in said film window, said first pressure plate being relatively resilient and extending across substantially the entire width of said film to contact the edges thereof, the central portion of said first pressure plate being formed outward to avoid contact with the emulsion of said film; and said second pressure plate being relatively nonresilient and extending across substantially the entire width of said film to press the edges of said film into contact with said first pressure plate; said first and second pressure plates being retained in position in said cartridge body by the resilient action of said first pressure plate.

3. A film cartridge as in claim 2 wherein said second pressure plate includes a plurality of fingers extending from each end thereof for engaging said cartridge body.

4. A film cartridge as in claim 1 further comprising mounting means disposed on one of said sides of said cartridge body for mounting and aduio-tape cartridge on said film cartridge to form a combined audiovisual cartridge.

5. An audiovisual display apparatus for use with an audiovisual cartridge containing an audio tape and a projection film and having a pair of ramps extending from the sides thereof, said audiovisual display apparatus comprising:
   a chassis having a projection opening;
   an illuminating system including
   a light source,
   a condensing system to gather and converge the light from said light source through the projection film,
   a projection lens for receiving light through the projection film, and
   an adjustable reflector device disposed at an angle of approximately 45° to said projection lens for reflecting the light from said projection lens through said projection opening in said chassis;
   a mounting plate mounted on said chassis and having an opening for receiving the audiovisual cartridge;
   a control lever movably mounted on said mounting plate;
   a locking mechanism for engaging the ramps of the audiovisual cartridge to lock the audiovisual cartridge in position in said opening in said mounting plate when said control lever is moved in a first direction and for disengaging the ramps of the audiovisual cartridge to unlock the audiovisual cartridge when said control lever is moved in a second direction;
   an audio-tape drive capstan;
   an audio-tape pinch roller;
   a sound reproduction head; and
   an actuating mechanism connected to said control lever for retracting said pinch roller from said drive capstan and for retracting said sound reproduction head from said audio tape when said control lever is moved to unlock the audiovisual cartridge and for urging said pinch roller to contact said drive capstan and for urging said sound reproduction head to contact said audio tape when said control lever is rotated to cause said locking mechanism to lock the audiovisual cartridge in position within said opening in said mounting plate.

6. The audiovisual display apparatus of claim 5 wherein said locking mechanism comprises:
   a first arm having a first end and a second end, said first end of said first arm being pivotally mounted on said mounting plate;
   a second arm having a first end and a second end, said second arm being pivotally mounted at its middle on said mounting plate;
   a link member linking said second end of said first arm to said first end of said second arm;
   a first locking lug projecting from the middle of said first arm toward said second arm;
   a second locking lug projecting from said second end of said second arm toward said first arm; and
   spring means urging said first locking lug toward said second locking lug to engage the ramps on the opposite sides of the audiovisual cartridge and thereby hold the audiovisual cartridge in position in said opening in said mounting plate;
   said control lever moving said locking mechanism against the action of said spring means to withdraw said first and second locking lugs from the ramps in the audiovisual cartridge and thereby release the audiovisual cartridge from said mounting plate.

7. The audiovisual display apparatus of claim 6 wherein said control lever is pivotally mounted on said mounting plate adjacent one of said arms and further comprising
   a cam element mounted on said control lever for contacting and moving said one of said arms to withdraw said first and second locking lugs from the ramps on the audiovisual cartridge when said control lever is rotated.

8. The audiovisual display apparatus of claim 5 wherein said actuating mechanism comprises:
   first spring means urging said pinch roller toward said drive capstan; and
   first means responsive to said control lever for retracting said pinch roller from said drive capstan when said control lever is moved to cause said locking mechanism to unlock the audiovisual cartridge from said mounting plate, and for permitting said pinch roller to contact said drive capstan in response to said first spring means when said control lever is moved to cause said locking mechanism to lock the audiovisual cartridge in position in the opening in said mounting plate.

9. The audiovisual display apparatus of claim 8 wherein said actuating mechanism further comprises:
   second spring means urging said sound reproduction head toward said audio-tape in said audiovisual cartridge; and
   second means responsive to said control lever for retracting said sound reproduction head from said audio-tape when said control lever is moved to cause said locking mechanism to unlock the audiovisual cartridge from said mounting plate, and for permitting said sound reproduction head to contact said audio-tape in response to said second spring means when said control lever is moved to cause said locking mechanism to lock said audiovisual cartridge in position in said opening in said mounting plate.

10. The audiovisual display apparatus of claim 9 wherein said first means responsive to said control lever comprises a first movable plate mounted for movement parallel to said mounting plate and carrying said pinch roller, said first spring means being connected to said first movable plate to urge said pinch roller toward said drive capstan; and a link member connecting said first movable plate to said control lever.

11. The audiovisual display apparatus of claim 10 wherein said second means responsive to said control means comprises:
   a second movable plate mounted for movement parallel to said mounting plate and carrying said sound reproduction head, said second spring means being connected to said second movable plate to urge said sound reproduction head toward the audio-tape;
   a stud projecting from said second movable plate; and
   a linking arm having a first end and a second end, said linking arm being pivotally mounted at its middle to said mounting plate said first end of said arm being connected to said first movable plate, and said second end of said arm being adapted to contact said lug to move said second movable plate and said sound reproduction head away from said audio-tape when said first movable plate and said pinch roller move away from said drive capstan, and to release said lug to allow said second movable plate and said sound reproduction head to move toward said audio-tape when said first movable plate and said pinch roller move toward said drive capstan.

12. The audiovisual display apparatus of claim 11 wherein said actuating mechanism further comprises:
   an adjustable stop screw threadedly mounted on said mounting plate, one end of said adjustable stop screw being positioned to contact said second movable plate to limit the movement of said second movable plate and said sound reproduction head toward said audio-tape.

13. The audiovisual display apparatus of claim 12 wherein said locking mechanism comprises:

a first arm having a first end and a second end, said first end of said first arm being pivotally mounted on said mounting plate;

a second arm having a first end and a second end, said second arm being pivotally mounted at its middle on said mounting plate;

a link member linking said second end of said first arm to said first end of said second arm;

a first locking lug projecting from the middle to said first arm toward said second arm;

a second locking lug projecting from said second end of said second arm toward said first arm;

third spring means urging said first locking lug toward said second locking lug to engage opposite sides of the audiovisual cartridge and thereby hold the audiovisual cartridge in position on said mounting plate; and a cam element mounted on said control lever for contacting and moving one of said arms to retract said first and second locking lugs from the audiovisual cartridge when said control lever is moved.